United States Patent
Cain et al.

(10) Patent No.: US 7,302,501 B1
(45) Date of Patent: Nov. 27, 2007

(54) PERIPHERAL DATA STORAGE SYSTEM WITH MULTI-STATE USER DISPLAY

(75) Inventors: William C. Cain, Foothill Ranch, CA (US); Kevin W. McLaughlin, Mission Viejo, CA (US); Barry L. Klein, Trabuco Canyon, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 496 days.

(21) Appl. No.: 10/815,516

(22) Filed: Mar. 31, 2004

(51) Int. Cl.
*G06F 3/00* (2006.01)
*G06F 13/12* (2006.01)

(52) U.S. Cl. .................. 710/15; 710/16; 710/17; 710/18; 710/19; 710/62

(58) Field of Classification Search ............ 710/15, 710/16, 17, 18, 19, 62
See application file for complete search history.

(56) References Cited

U.S. PATENT DOCUMENTS

| | | |
|---|---|---|
| D308,515 S | 6/1990 | Stead |
| D308,517 S | 6/1990 | Horie |
| D309,294 S | 7/1990 | Sottsass |
| D313,015 S | 12/1990 | Ryan et al. |
| D335,489 S | 5/1993 | Sander |
| 5,263,668 A | 11/1993 | Reiter |
| 5,276,865 A | 1/1994 | Thorpe |
| 5,388,792 A | 2/1995 | Hastings et al. |
| D358,581 S | 5/1995 | Daniels |
| 5,469,573 A | 11/1995 | McGill, III et al. |
| D365,331 S | 12/1995 | Martin et al. |
| D366,464 S | 1/1996 | Martin |
| 5,657,455 A * | 8/1997 | Gates et al. ............ 710/100 |
| 5,749,637 A | 5/1998 | McMahan et al. |
| 5,754,112 A * | 5/1998 | Novak .................. 340/635 |

(Continued)

FOREIGN PATENT DOCUMENTS

JP        03-232012       10/1991

(Continued)

OTHER PUBLICATIONS

The Authoritative Dicitionary of IEEE Standards Terms; 2000; IEEE Press; Seventh Edition, p. 1241, word "user".*

(Continued)

*Primary Examiner*—Alan S. Chen
(74) *Attorney, Agent, or Firm*—Howard H. Sheerin, Esq.

(57) ABSTRACT

A method of displaying states of a peripheral data storage system (PDSS) comprising a data storage device, a data storage system controller, a user-actuated signaling subsystem, a user display subsystem adapted to display the states, and a peripheral data storage controller host interface adapted for communication with a host system. The method includes determining a state of the PDSS; displaying a first display state via the user display subsystem if the PDSS is in an idle state; displaying a second display state via the user display subsystem if the PDSS is in a state corresponding to receiving a signal from the user-actuated signaling subsystem; displaying a third display state via the user display subsystem if the PDSS is in a dynamically active state; and displaying a fourth display state via the user display subsystem if the PDSS is in an off state.

20 Claims, 3 Drawing Sheets

U.S. PATENT DOCUMENTS

| | | | |
|---|---|---|---|
| 5,815,652 | A | 9/1998 | Ote et al. |
| 5,887,962 | A | 3/1999 | Tsai |
| 6,049,885 | A | 4/2000 | Gibson et al. |
| 6,059,384 | A | 5/2000 | Ho |
| 6,176,461 | B1 | 1/2001 | Beaman et al. |
| 6,311,941 | B1 | 11/2001 | Feldmeyer |
| 6,374,363 | B1 | 4/2002 | Wu et al. |
| 6,439,528 | B1 | 8/2002 | Goto et al. |
| 6,688,708 | B1 | 2/2004 | Janson |
| 6,892,288 | B2 | 5/2005 | Serichol Blasco |
| 7,013,336 | B1* | 3/2006 | King ......................... 709/224 |
| 7,058,662 | B2 | 6/2006 | Wiggins et al. |
| 7,114,067 | B2* | 9/2006 | Sukigara ....................... 713/2 |
| 7,117,276 | B2* | 10/2006 | Maeda et al. ................. 710/36 |
| 2003/0163627 | A1* | 8/2003 | Deng et al. ................. 710/305 |
| 2004/0010732 | A1 | 1/2004 | Oka |
| 2004/0044649 | A1 | 3/2004 | Yamato et al. |
| 2004/0136224 | A1 | 7/2004 | Hamer et al. |
| 2004/0143684 | A1* | 7/2004 | Cheng .......................... 710/1 |
| 2005/0015477 | A1 | 1/2005 | Chen |
| 2005/0044220 | A1* | 2/2005 | Madhavan .................. 709/225 |
| 2005/0091425 | A1 | 4/2005 | Wyatt et al. |
| 2005/0128626 | A1* | 6/2005 | Suzuki et al. ................. 360/71 |
| 2005/0160213 | A1* | 7/2005 | Chen .......................... 710/305 |
| 2006/0277433 | A1 | 12/2006 | Largman et al. |

FOREIGN PATENT DOCUMENTS

WO    WO 2004/023262 A2    3/2004

OTHER PUBLICATIONS

Hard Disk Info.—The Storage Authority, "Freecom FHD-1—The Intelligent Solution"; May 28, 2002, 2 pages.

* cited by examiner

PERIPHERAL DATA STORAGE SYSTEM WITH MULTI-STATE USER DISPLAY

This invention relates to peripheral data storage systems. More particularly, the present invention is directed to peripheral data storage systems with multi-state user display.

BACKGROUND OF THE INVENTION

External peripheral data storage systems such as external disk drives and card readers are standalone units that are commonly mounted to and communicate with a host computer, generally via an external cable such as a universal serial bus (USB) cable or Firewire™ cable.

It is desirable to provide users of peripheral data storage system with some form of display which notifies the users of the status of the peripheral data storage system and provides reassurance that the peripheral data storage system is operational. More recently, these peripheral data storage systems have become more complicated due to added functions and backup options. In today's competitive market, however, complex displays can add to the overall cost of the peripheral data storage system while also being confusing to the user.

Accordingly, what is needed is a more cost-effective method for the notifying the users of the status of the peripheral data storage system.

SUMMARY OF THE INVENTION

This invention can be regarded as a method of displaying states of a peripheral data storage system comprising a data storage device, a data storage system controller, a user-actuated signaling subsystem, a user display subsystem adapted to display the states, and a peripheral data storage controller host interface adapted for communication with a host system. The method includes determining a state of the peripheral data storage system; displaying a first display state via the user display subsystem if the peripheral data storage system is in an idle state; and displaying a second display state via the user display subsystem if the peripheral data storage system is in a state corresponding to receiving a signal from the user-actuated signaling subsystem.

The method further includes displaying a third display state via the user display subsystem if the peripheral data storage system is in a dynamically active state; and displaying a fourth display state via the user display subsystem if the peripheral data storage system is in an off state.

DETAILED DESCRIPTION OF THE INVENTION

Figure 1:
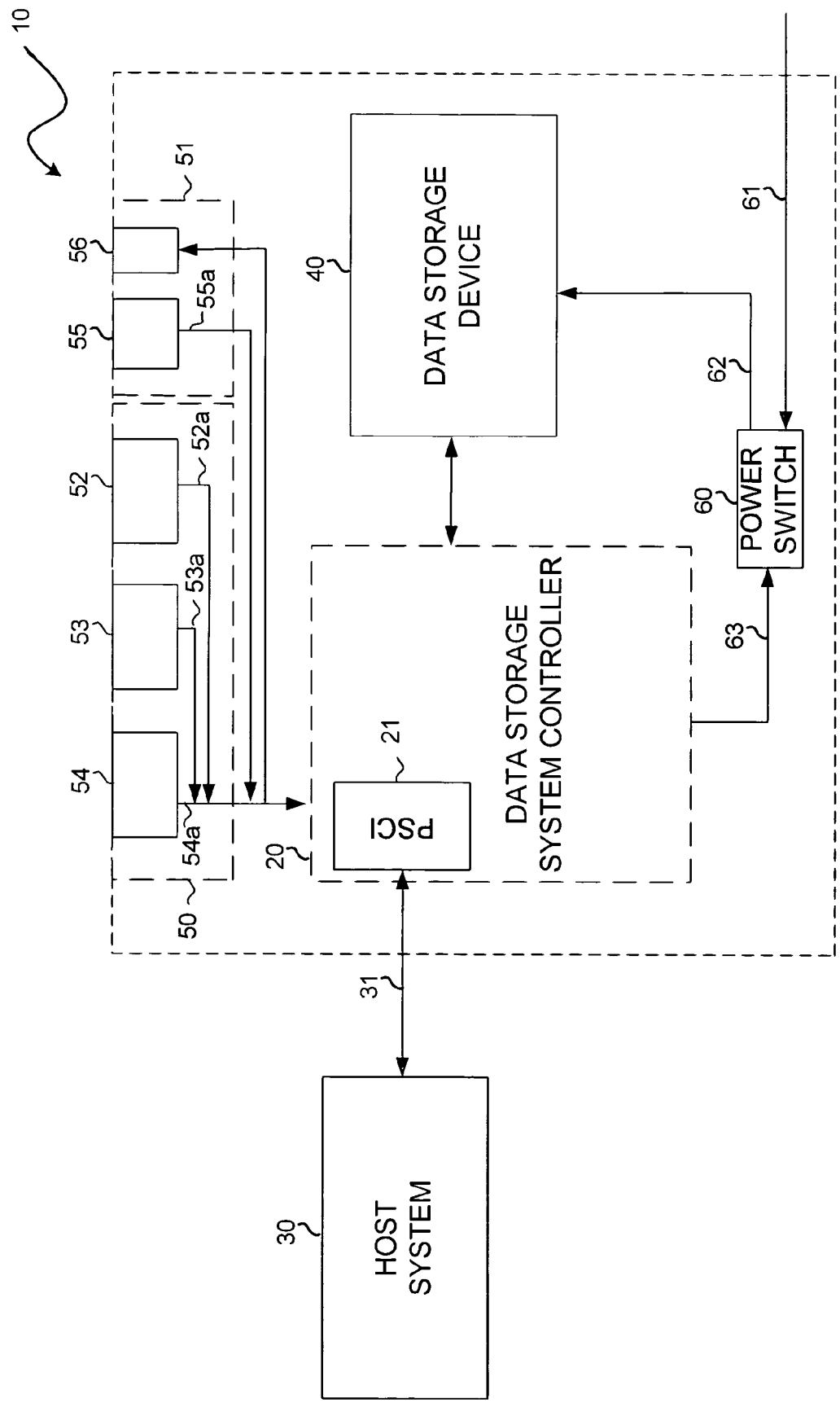
FIG. 1 illustrates an exemplary peripheral data storage system in which the present invention may be practiced.

With reference to FIG. 1, an exemplary peripheral data storage system 10 is shown in which the method of the present invention for displaying states of a peripheral data storage system 10 may be practiced. As shown in FIG. 1, the peripheral data storage system 10 such as an external disk drive system, comprises a data storage device 40, such as a disk drive, a data storage system controller 20, a user-actuated signaling subsystem 50, a user display subsystem 51 adapted to display the states of the peripheral data storage system 10, and peripheral data storage controller host interface 21 adapted for communication with the host system 30 via the communication medium 31, such as a universal serial bus (USB) cable or a Firewire™ cable. Suitably, the user-actuated signaling subsystem 50 comprises electro-mechanical switches 52, 53 and 54. Suitably, the data storage system controller 20 is a bridge controller and the peripheral data storage controller host interface 21 is a bridge controller host interface. During the operations of the data storage device 40, the peripheral system controller 20 transmits command 63 to the power switch 60 for providing the data storage device 40 with a DC operating current 62 inputted via line 61 from an external power source (not shown). Suitably, the user display subsystem 51 comprises an electro-mechanical switch 55, such as a power button, for turning power on and off to the peripheral data storage system 10.

Figure 2A:
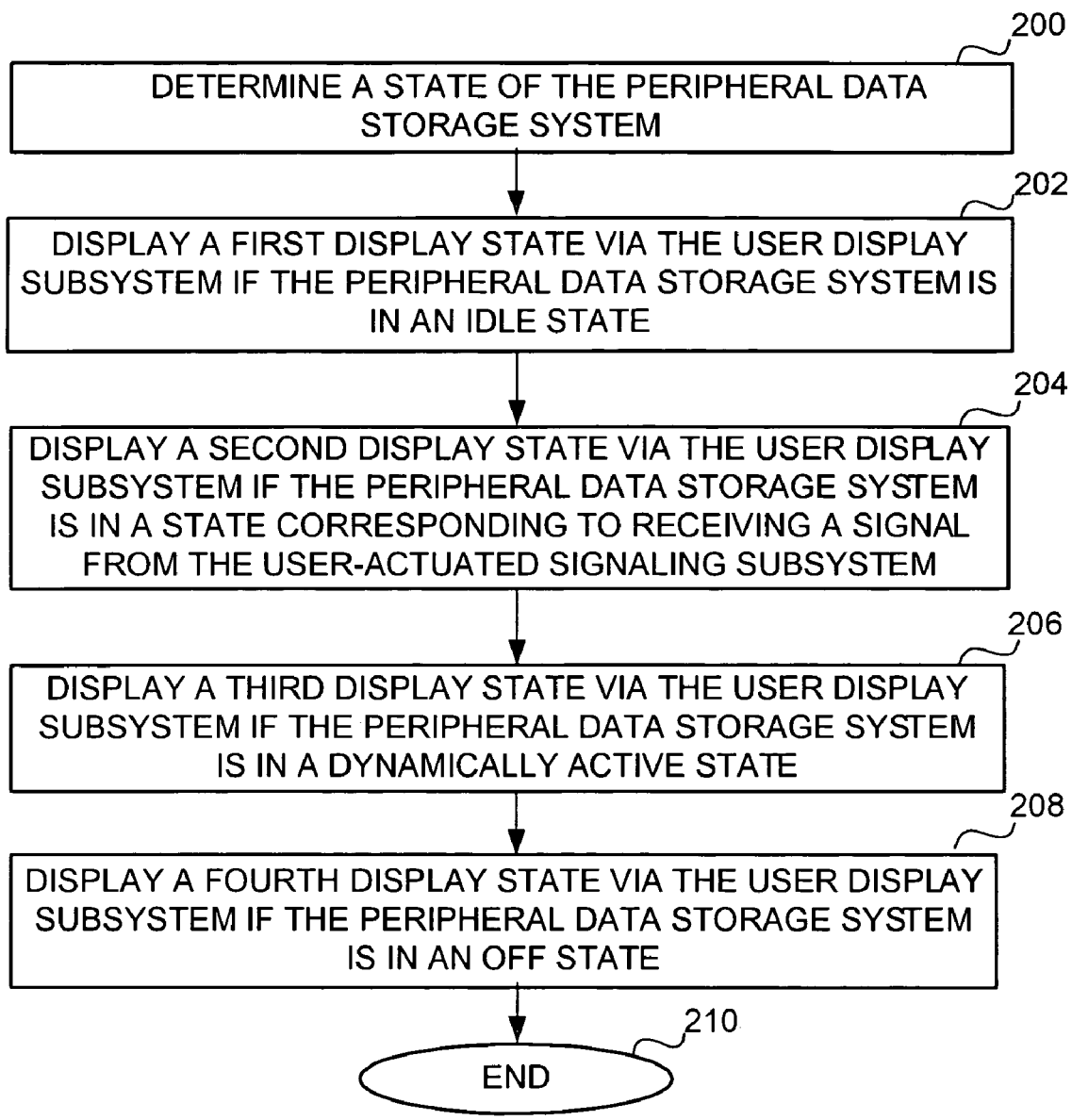
FIGS. 2A-B are flow charts illustrating the method of the present invention used in the exemplary peripheral data storage system shown in FIG. 1.
Figure 2B:
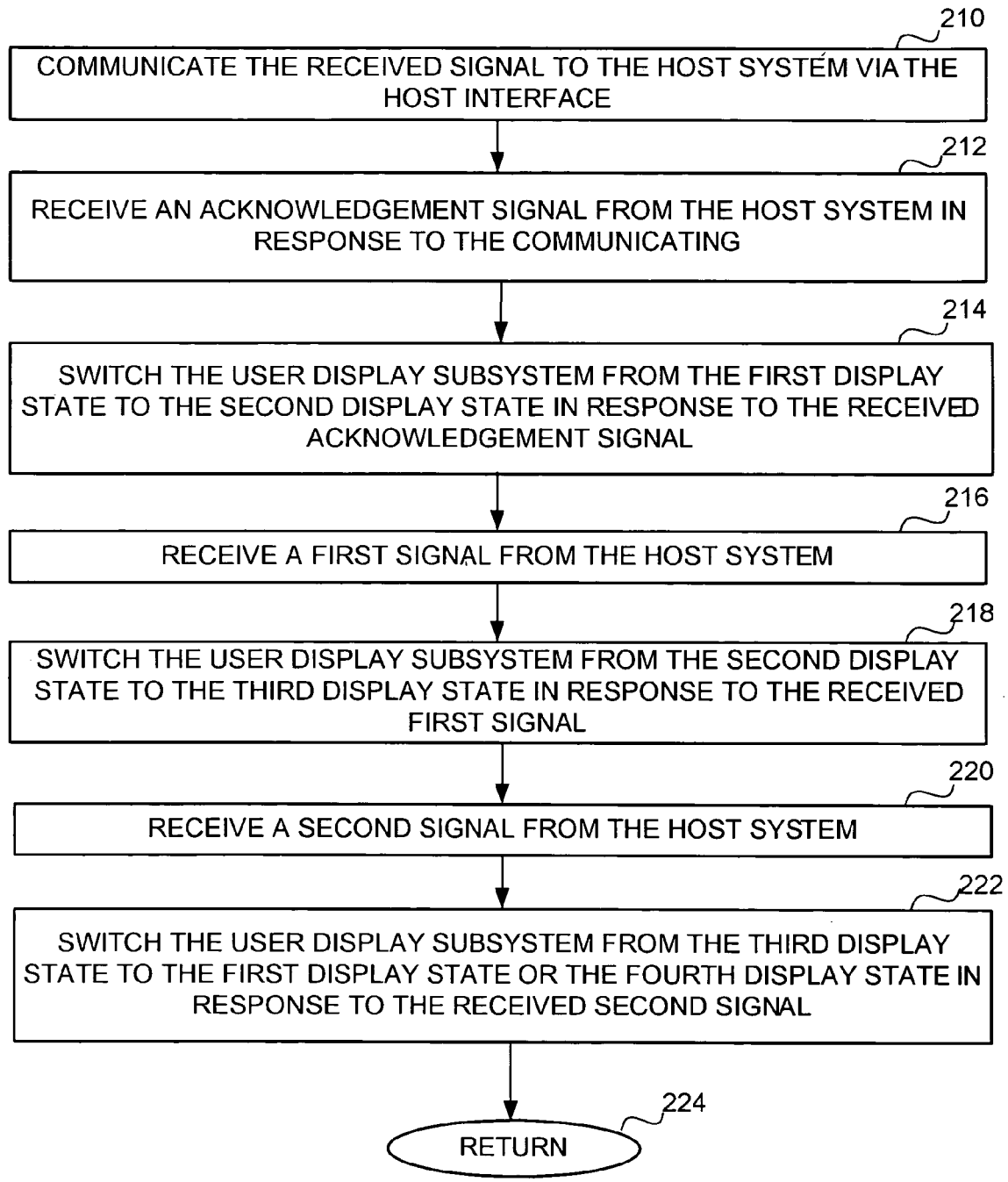

FIGS. 2A-B are flow charts illustrating the method of the present invention for displaying states of the peripheral data storage system 10 shown in FIG. 1. As shown in FIG. 2A, the process begins in block 200 in which a state of the peripheral data storage system 10 is determined. Next, in block 202, a first display state is displayed via the user display subsystem 51 if the peripheral data storage system 10 is in an idle state. Next, in block 204 a second display state is displayed via the user display subsystem 51 if the peripheral data storage system 10 is in a state corresponding to receiving a signal from the user-actuated signaling subsystem, as described below and in greater detail in conjunction with FIG. 2B. Next, in block 206, a third display state is displayed via the user display subsystem 51 if the peripheral data storage system 10 is in a dynamically active state, such as when the data storage device 40 is being addressed to perform a data transfer command. Suitably, for a data storage device 40 conforming to the Advanced Technology Attachment (ATA) standard may provide a Drive Active Slave Present (DASP) signal, defined in the ATA standard, corresponding to the above mentioned dynamically active state. Suitably, if the peripheral data storage system 10 employs a data storage devices 40 conforming to the Serial ATA (SATA), a logic function on the data storage system controller 20 can provide a logic function signal corresponding to a command being sent to the data storage device 40. Next, in block 208, a fourth display state is displayed via the user display subsystem 51 if the peripheral data storage system 10 is in an off state, such as an off state corresponding to an off state of the data storage device 40. Suitably the user display subsystem 51 comprises a user-visible display device 56 adapted to display the first, second and third display states in the form of a first, a second and a third displaying of emitted light. Suitably, the first displaying of emitted light comprises a continuous displaying of emitted light, the second displaying of emitted light is a first flashing pattern, the third displaying of emitted light is a second flashing pattern, such as an aperiodic flashing pattern corresponding to the receipt of the above described DASP or logic function signals, and the fourth display state comprises an absence of emitted light. The user-visible display device 56 may also suitably comprises an alpha-numeric display adapted to display the first, second, and third display states in the form of a first, a second and a third displaying of alpha-numeric characters. Then flow the proceeds to block 210 where the overall process ends.

FIG. 2B, in conjunction with FIG. 1, further describes the process of displaying a second display state in block 204 of FIG. 2A. As shown in FIG. 2B, the process begins in block 210 in which the received signal is communicated to the host system 30 via the host interface 21. The received signal may correspond to a first user-inputted request for a mounting or dismounting of the peripheral data storage system 10. Suitably, the user-actuated signaling subsystem 50 comprises a first electro-mechanical switch 52 adapted to receive the first user-inputted request and the user-actuated signaling subsystem 50 is adapted to generate the received signal 52a based on the first user-inputted request. The received signal may also correspond to a second user-inputted request for performing a task corresponding to a host-scheduled backup operation for a scheduled backing up of data to the peripheral data storage system 10. Suitably, the user-actuated signaling subsystem 50 comprises a second electro-mechanical switch 53 adapted to receive the second user-inputted request and the user-actuated signaling subsystem 50 is adapted to generate the received signal 53a based on the second user-inputted request. The received signal may also correspond to a third user-inputted request for performing an on-demand backing up of pre-selected data to the peripheral data storage system 10. Suitably, the user-actuated signaling subsystem 50 comprises a third electro-mechanical switch 54 adapted to receive the third user-inputted request and the user-actuated signaling subsystem 50 is adapted to generate the received signal 54a based on the third user-inputted request.

Next, in block 212, an acknowledgement signal is received from the host system 30 in response to the communicating of block 210. Next, in block 214, the user display subsystem 51 is switched from the first display state to the second display state in response to the received acknowledgement signal. Next, in block 216, a first signal is received from the host system 30. Next, in block 218, the user display subsystem 51 is switched from the second display state to the third display state in response to the received first signal. Next, in block 220, a second signal is received from the host system 30. Next, in block 222, the user display subsystem 51 is switched from the third display state to either the first display state or the fourth display state in response to the received second signal. For example, if the signal received in block 210 corresponded to a second user-inputted request for performing a task of enabling of a host-scheduled backup operation, then in block 222 the user display subsystem 51 is switched from the third display state to the first display state which comprises displaying a continuous displaying of emitted light on the user-visible display device 56. If the signal received in block 210 corresponded to a second user-inputted request for performing a task of disabling of a host-scheduled backup operation, then in block 222 the user display subsystem 51 is switched from the third display state to the fourth display state which comprises an absence of emitted light on the user-visible display device 56. The flow then proceeds to block 224 for returning to block 204 of FIG. 2A.

One advantage of the foregoing feature of the present invention over the prior art is that by using a single multi-state user-visible display device having four display states, the need for complex displays that can add to the overall cost of the peripheral data storage system while also being confusing to the user can be reduced.

It should be noted that the various features of the foregoing embodiment were discussed separately for clarity of description only and they can be incorporated in whole or in part into a single embodiment of the invention having all or some of these features.

What is claimed is:

1. A method of displaying states of a peripheral data storage system comprising a data storage device, a data storage system controller, a user-actuated signaling subsystem, and a user display subsystem adapted to display the states, the method comprising:
communicating with a host system over a host interface;
determining a state of the peripheral data storage system;
displaying a first display state via the user display subsystem when the peripheral data storage system is in an idle state;
displaying a second display state via the user display subsystem when the peripheral data storage system is in a state corresponding to receiving a signal from the user-actuated signaling subsystem;
displaying a third display state via the user display subsystem when the peripheral data storage system is in a dynamically active state; and
displaying a fourth display state via the user display subsystem when the peripheral data storage system is in an off state.

2. The method of claim 1, wherein the user display subsystem comprises an electro-mechanical switch for at least one of a turning power on and off to the peripheral data storage system.

3. The method of claim 2, wherein the user display subsystem comprises a user-visible display device adapted to display the first, second and third display states in the form of a first, a second and a third displaying of emitted light.

4. The method of claim 3, wherein the user-visible display device comprises an alpha-numeric display adapted to display the first, second, and third display states in the form of a first, a second and a third displaying of alpha-numeric characters.

5. The method of claim 3, wherein the first displaying of emitted light comprises a continuous displaying of emitted light.

6. The method of claim 3, wherein the second displaying of emitted light comprises a first flashing pattern.

7. The method of claim 3, wherein the third displaying of emitted light comprises a second flashing pattern.

8. The method of claim 7, wherein the second flashing pattern comprises an aperiodic flashing pattern.

9. The method of claim 3, wherein the fourth display state comprises an absence of emitted light.

10. The method of claim 1, wherein the received signal corresponds to a first user-inputted request for at least one of a mounting and dismounting of the peripheral data storage system.

11. The method of claim 1, wherein the received signal corresponds to a second user-inputted request for performing a task corresponding to a host-scheduled backup operation for a scheduled backing up of data to the peripheral data storage system.

12. The method of claim 1, wherein the received signal corresponds to a third user-inputted request for performing an on-demand backing up of pre-selected data to the peripheral data storage system.

13. The method of claim 1, wherein the off state corresponds to an off state of the data storage device.

14. The method of claim 1, wherein displaying the second display state further comprises:
communicating the received signal to the host system via the host interface;
receiving an acknowledgement signal from the host system in response to the communicating;

switching the user display subsystem from the first display state to the second display state in response to the received acknowledgement signal;

receiving a first signal from the host system;

switching the user display subsystem from the second display state to the third display state in response to the received first signal;

receiving a second signal from the host system; and switching the user display subsystem from the third display state to at least one of the first display state and the fourth display state in response to the received second signal.

15. The method of claim 10, wherein the user-actuated signaling subsystem comprises a first electro-mechanical switch adapted to receive the first user-inputted request and wherein the user-actuated signaling subsystem is adapted to generate the received signal based on the first user-inputted request.

16. The method of claim 11, wherein the user-actuated signaling subsystem comprises a second electro-mechanical switch adapted to receive the second user-inputted request and wherein the user-actuated signaling subsystem is adapted to generate the received signal based on the second user-inputted request.

17. The method of claim 12, wherein the user-actuated signaling subsystem comprises a third electro-mechanical switch adapted to receive the third user-inputted request and wherein the user-actuated signaling subsystem is adapted to generate the received signal based on the third user-inputted request.

18. The method of claim 1, wherein the peripheral data storage controller host interface is adapted for communication with the host system via at least one of a universal serial bus (USB) cable and a Firewire™ cable.

19. The method of claim 1, wherein the peripheral data storage system comprises a disk drive system and wherein the data storage device is a disk drive.

20. A peripheral data storage system comprising a data storage device, a user-actuated signaling subsystem, a user display subsystem adapted to display states, and a data storage system controller operable to:

communicate with a host system over a host interface;

determine a state of the peripheral data storage system;

display a first display state via the user display subsystem when the peripheral data storage system is in an idle state;

display a second display state via the user display subsystem when the peripheral data storage system is in a state corresponding to receiving a signal from the user-actuated signaling subsystem;

display a third display state via the user display subsystem when the peripheral data storage system is in a dynamically active state; and display a fourth display state via the user display subsystem when the peripheral data storage system is in an off state.

* * * * *